(12) United States Patent
Saadat et al.

(10) Patent No.: US 9,525,337 B2
(45) Date of Patent: Dec. 20, 2016

(54) CHARGE-RECYCLING CIRCUITS

(71) Applicant: QUALCOMM Incorporated, San Diego, CA (US)

(72) Inventors: Seyed Mahmoudreza Saadat, La Jolla, CA (US); Chunlei Shi, San Diego, CA (US); Chenchang Zhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 14/260,592

(22) Filed: Apr. 24, 2014

(65) Prior Publication Data

US 2015/0311783 A1    Oct. 29, 2015

(51) Int. Cl.
| H03K 3/00 | (2006.01) |
| H02M 3/07 | (2006.01) |
| G05F 1/577 | (2006.01) |
| G05F 1/575 | (2006.01) |

(52) U.S. Cl.
CPC ............... *H02M 3/07* (2013.01); *G05F 1/575* (2013.01); *G05F 1/577* (2013.01)

(58) Field of Classification Search
USPC ........ 327/108–109, 112, 387–389, 419, 427, 327/434, 536–537
See application file for complete search history.

(56) References Cited

U.S. PATENT DOCUMENTS

| 5,483,486 A | 1/1996 | Javanifard et al. |
| 5,532,653 A | 7/1996 | Adkins |
| 5,808,506 A | 9/1998 | Tran |
| 5,986,487 A * | 11/1999 | Ridgers ............... H03K 17/667 327/157 |
| 6,504,349 B2 | 1/2003 | Jaworski |
| 7,394,298 B2 | 7/2008 | Hazucha et al. |
| 7,427,888 B2 | 9/2008 | Zhang et al. |
| 8,115,461 B2 | 2/2012 | Yoshio |
| 8,212,400 B2 | 7/2012 | Wu et al. |

(Continued)

FOREIGN PATENT DOCUMENTS

| EP | 0836129 A1 | 4/1998 |
| EP | 1443650 A2 | 8/2004 |

(Continued)

OTHER PUBLICATIONS

Alimadadi M., et al., "A Fully Integrated 660 MHz Low-Swing Energy-Recycling DC-DC Converter," IEEE Transactions on Power Electronics, Jun. 2009, vol. 24 (6), pp. 1475-1485.

(Continued)

*Primary Examiner* — An Luu
(74) *Attorney, Agent, or Firm* — Haynes and Boone, LLP (57) ABSTRACT

In one embodiment, a circuit comprises a first load circuit coupled to a first input voltage. A current sinking circuit is coupled to an output of the first load circuit. A second load circuit is coupled to ground. A current sourcing circuit is coupled between a second input voltage and an output of the second load circuit. A charge-recycling circuit is coupled between the output of the first load circuit and the output of the second load circuit to provide current from the current sinking circuit to the output of the current sourcing circuit to reduce current through the current sourcing circuit. The charge-recycling circuit can be a charge pump.

20 Claims, 4 Drawing Sheets

(56) References Cited

U.S. PATENT DOCUMENTS

| | | |
|---|---|---|
| 2005/0088394 A1 | 4/2005 | Chung |
| 2007/0177412 A1 | 8/2007 | Sharp |
| 2010/0219881 A1 | 9/2010 | Chen et al. |
| 2013/0113446 A1 | 5/2013 | De Haas |
| 2013/0234785 A1 | 9/2013 | Dai et al. |
| 2013/0257176 A1 | 10/2013 | Crespi et al. |
| 2015/0311784 A1 | 10/2015 | Saadat et al. |

FOREIGN PATENT DOCUMENTS

| | | |
|---|---|---|
| WO | 9835433 A1 | 8/1998 |
| WO | 2006078244 A1 | 7/2006 |

OTHER PUBLICATIONS

Bayer E., et al., "Charge pump with Active Cycle regulation-closing the gap between linear and skip modes," IEEE 31st Annual Power Electronics Specialists Conference, 2000, vol. 3, pp. 1497-1502.

Mazumdar K., et al., "Exploration of Charge Recycling DC-DC Conversion Using a Switched Capacitor Regulator," Journal of Low Power Electronics and Applications, 2013, vol. 3 (3), pp. 250-266.

Rajapandian S., et al., "High-Voltage Power Delivery through Charge Recycling," IEEE Journal of Solid-State Circuits, Jun. 2006, vol. 41 (6), pp. 1400-1410.

Ueda K., et al., "Low-Power On-Chip Charge-Recycling DC-DC Conversion Circuit and System," IEEE Journal of Solid-State Circuits, Nov. 2013, vol. 48 (11), pp. 2608-2617.

Wen Y., et al., "Closed-loop control of gate-charge recycling in a 20 MHz dc-dc converter," 2010 IEEE 12th Workshop on Control and Modeling for Power Electronics (COMPEL), Jun. 2010, pp. 1-7.

International Search Report and Written Opinion—PCT/US2015/027382—ISA/EPO—Jul. 7, 2015.

Rajapandian S., et al., "Implicit DC-DC Downconversion Through Charge-Recycling", IEEE Journal of Solid-State Circuits, IEEE Service Center, Piscataway, NJ,USA, vol. 40, No. 4, Apr. 1, 2005, pp. 846-852, XP011130838, ISSN: 0018-9200, DOI: 10.1109/JSSC.2004.842861.

International Search Report and Written Opinion—PCT/US2015/027384—ISA/EPO—Jun. 19, 2015.

Office Action Dated May 9, 2016; U.S. Appl. No. 14/260,658; (19 pgs.).

* cited by examiner

CHARGE-RECYCLING CIRCUITS

RELATED APPLICATIONS

This application is related to U.S. patent application Ser. No. 14/260,658, filed on even date herewith, entitled "CHARGE PUMPS HAVING VARIABLE GAIN AND VARIABLE FREQUENCY" and U.S. patent application Ser. No. 14/260,733, filed on even date herewith, entitled "CHARGE-RECYCLING CIRCUITS INCLUDING SWITCHING POWER STAGES WITH FLOATING RAILS," which are incorporated by reference herein in their entirety.

BACKGROUND

The disclosure relates to charge-recycling circuits, and in particular, to charge-recycling circuits using charge pumps.

Unless otherwise indicated herein, the approaches described in this section are not admitted to be prior art by inclusion in this section.

Regulators are often used to source and sink current to loads in the same system. For example, a low dropout regulator (LDO) may be used to produce a voltage on a node of a first cascode circuit and another LDO may be used to produce another voltage on a node of another cascode circuit (e.g., on the same integrated circuit). Current through each LDO results in energy loss and reduced efficiency. The energy loss also increases the operating temperature of the regulator and the system.

SUMMARY

The present disclosure describes charge-recycling circuits using charge pumps.

In one embodiment, a circuit comprises a first load circuit coupled to a first input voltage. A current sinking circuit is coupled to an output of the first load circuit. A second load circuit is coupled to ground. A current sourcing circuit is coupled between a second input voltage and an output of the second load circuit. A charge-recycling circuit is coupled between the output of the first load circuit and the output of the second load circuit to provide current from the current sinking circuit to the output of the current sourcing circuit to reduce current through the current sourcing circuit.

In one embodiment, the charge-recycling circuit is a charge pump.

In one embodiment, the charge-recycling circuit provides current from the current sinking circuit to the output of the current sourcing circuit that approximately equals current through the first load circuit.

In one embodiment, the circuit further comprises a switching regulator comprising cascode devices having gates coupled to the respective outputs of the current sinking circuit and the current sourcing circuit.

In one embodiment, the circuit further comprising a switching regulator comprising a first switching transistor, a first cascode transistor, a second cascode transistor, and a second switching transistor coupled in series between the first input voltage and ground. The first switching transistor has a gate coupled to the first load circuit. The first cascode transistor has a gate coupled to the current sourcing circuit. The second cascode transistor has a gate coupled to the current sinking circuit. The second switching transistor has a gate coupled to the second load circuit.

In one embodiment, the charge-recycling circuit has a variable gain based on the first input voltage.

In one embodiment, the current sourcing circuit is a low dropout regulator, and the current sinking circuit is a low dropout regulator.

In one embodiment, a voltage controlled oscillator is coupled to the charge-recycling circuit to provide a clock signal to control the timing of the charge recycling.

In one embodiment, the clock signal is based on the first input voltage.

In another embodiment, a circuit comprises a current sourcing circuit having an output. A current sinking circuit has an output. A first switch is configured to couple a first voltage signal to a first power switching device in response to a first control signal being active. A second switch is configured to couple the first switching device to the output of the current sourcing circuit in response to a second control signal. The first control signal and the second control signal are non-overlapping signals. A third switch is configured to couple the output of the current sinking circuit to a second power switching device in response to the first control signal. A fourth switch is configured to couple the second power switching device to ground in response to the second control signal. A charge-recycling circuit is coupled to the output of the current sourcing circuit and to the output of the current sinking circuit. The charge-recycling circuit receives charge from the current sourcing circuit in response to the second control signal being inactive and the first control signal being inactive, and provides charge to the current sinking circuit in response to the second control signal being active.

In one embodiment, the current sourcing circuit is a low dropout regulator, and the current sinking circuit is a low dropout regulator.

In one embodiment, the charge-recycling circuit has an adjustable gain that is adjusted based on the first voltage signal.

In one embodiment, a first terminal and a second terminal of the first power switching device are coupled to the first voltage signal and a first terminal of a power cascode device, respectively, and a gate of the first power switching device is coupled to the first switch and the second switch. A second terminal of the first power cascode device is coupled to an output terminal, and a gate of the power cascode device is coupled to the output of the current sourcing circuit. A first terminal of the second power switching device is coupled to ground, and a gate of the second power switching device is coupled to the third switch and the fourth switch. A first terminal and a second terminal of the second power cascode device are coupled to the output terminal and a second terminal of the second power switching device, respectively, and a gate of the second power cascode device is coupled to the output of the current sinking circuit.

In one embodiment, the current sinking circuit is coupled to a second voltage signal.

In one embodiment, the charge-recycling circuit has an adjustable gain that is adjusted based on the first voltage signal and the second voltage signal.

In yet another embodiment, a method comprises providing a first current from a first input voltage to a first load circuit coupled to a first node, the first node being at a first node voltage; providing a second current from a second node to a second load circuit coupled to ground; sinking a third current from the first node through a current sinking circuit to ground; sourcing a fourth current from a second input voltage to the second node, the second node being at a second node voltage, the second node voltage being greater than the first node voltage; and transferring charge from the first node to the second node to reduce the third current.

In one embodiment, a charge pump transfers the charge from the first node to the second node.

In one embodiment, transferring charge from the first node to the second node to reduce the third current reduces the third current to approximately zero.

In one embodiment, the method further comprises coupling the first node and the second node to respective gates of cascode devices of a switching regulator.

In one embodiment, the transferred charge is adjusted based on the difference between the first node voltage and the second node voltage.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
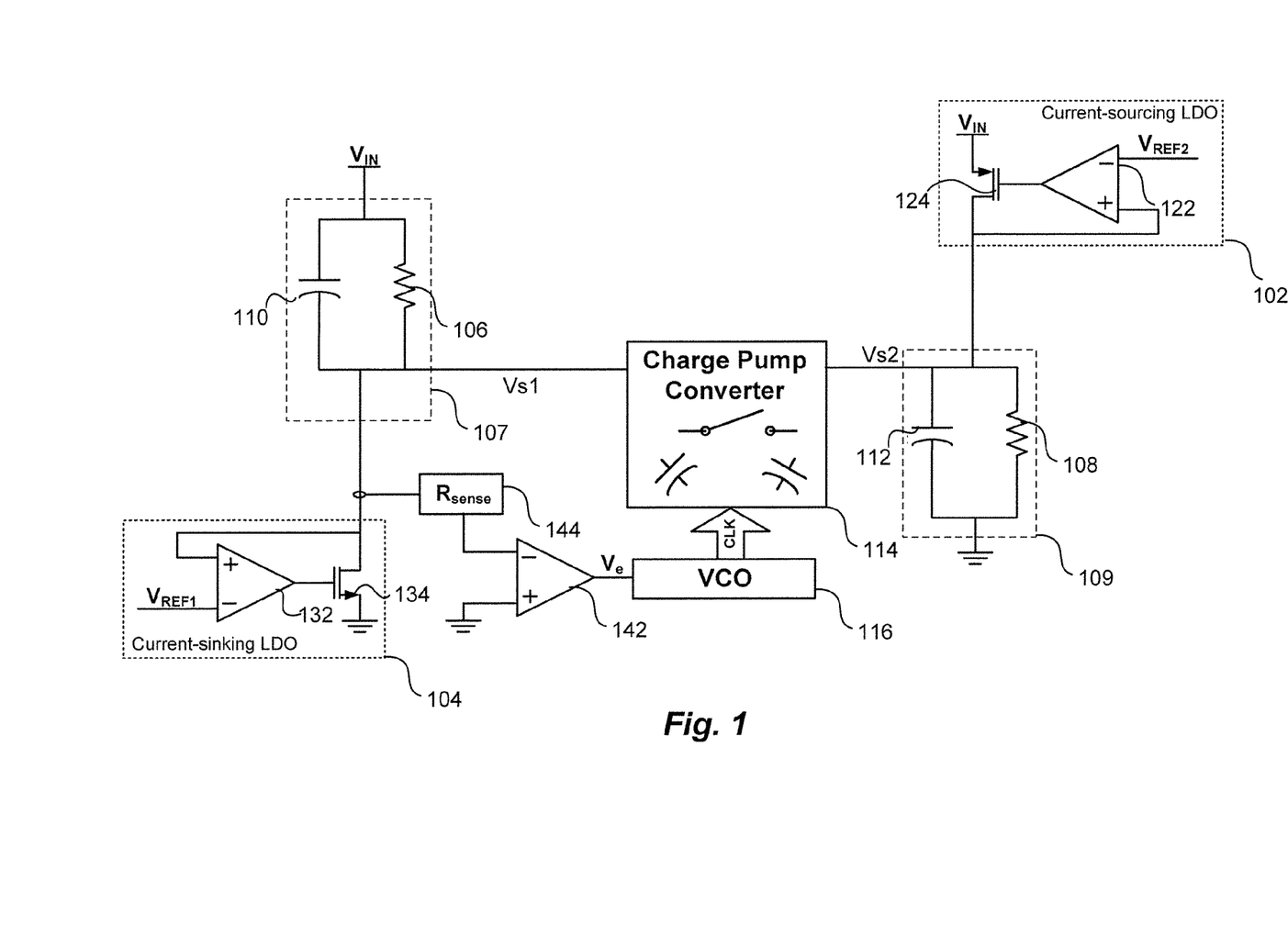
FIG. 1 is a block diagram illustrating a charge-recycling circuit according to an embodiment.

FIG. 1 is a block diagram illustrating a charge-recycling circuit 100 according to an embodiment. Charge-recycling circuit 100 comprises a current-sinking circuit 104 a current-sourcing circuit 102, a first load 107, a second load 109, a charge-recycling circuit 114, and a voltage controlled oscillator (VCO) 116. In various embodiments, current-sinking circuit 104 is a low dropout regulator (LDO) (referred to hereinafter as 'LDO 104') and can comprise an operational amplifier 122 and a pass transistor 124. In various embodiments, current-sourcing circuit 102 is a low dropout regulator (LDO) (referred to hereinafter as 'LDO 102') and can comprise an operational amplifier 132 and a pass transistor 134. In various embodiments, charge-recycling circuit 114 can be a switched capacitor circuit, or a charge pump, such as a boost charge pump. Charge-recycling circuit 114 is referred to hereinafter as 'charge pump 114.' Charge pump 114 can be a programmable or reconfigurable to have a variable gain of the amount of charge transferred through charge pump 114. First load 107 can include a resistor 106 and a capacitor 110 coupled in parallel. Second load 109 can include a resistor 108 and a capacitor 112 coupled in parallel.

Charge-recycling circuit 100 couples current between LDO 102 and LDO 104. Maintaining an LDO output voltage may, at times, require additional current, which is typically provided through LDO 102 or 104 causing energy loss. In one embodiment, changes in current required by one of LDO 102 or 104 may be provided from the LDO 102 or 104 so that the current through one or both of LDOs 102, 104 is reduced, thereby reducing power loss. This is referred to as charge recycling. In one embodiment shown in FIG. 1, charge pump 114 is coupled between outputs of LDO 102 that sources current and LDO 104 that sinks current. In one embodiment, charge-recycling circuit 100 comprises a feedback circuit that senses a voltage change (e.g., across one of LDO 102, 104) and reconfigures charge pump 114 to provide more charge to the output of the other LDO 102, 104 so that the other LDO 102, 104 does not need to increase its current, which reduces power loss. In one embodiment, the feedback circuit comprises a sense resistor 144 coupled to a common node (at a voltage VS1) between load 107 and LDO 104 and also comprises a comparator 142 that provides a compared voltage Ve to VCO 116 indicative of the voltage Vsl. In some embodiments, a feedback circuit is instead coupled to the output of LDO 102 (at a voltage VS2) or is coupled to the output of both LDOs 102 and 104 provides feedback to VCO 116. VCO 116 provides one or more clock (CLK) signals to charge pump 114 to control the charge transfer in charge pump 114. Because charge pump 114 can boost voltage, current-recycling system 100 provides charge transfer even for large differences in voltages between voltage VS1 and voltage VS2 and if the voltage VS2 is greater than the voltage VS1.

Figure 2:
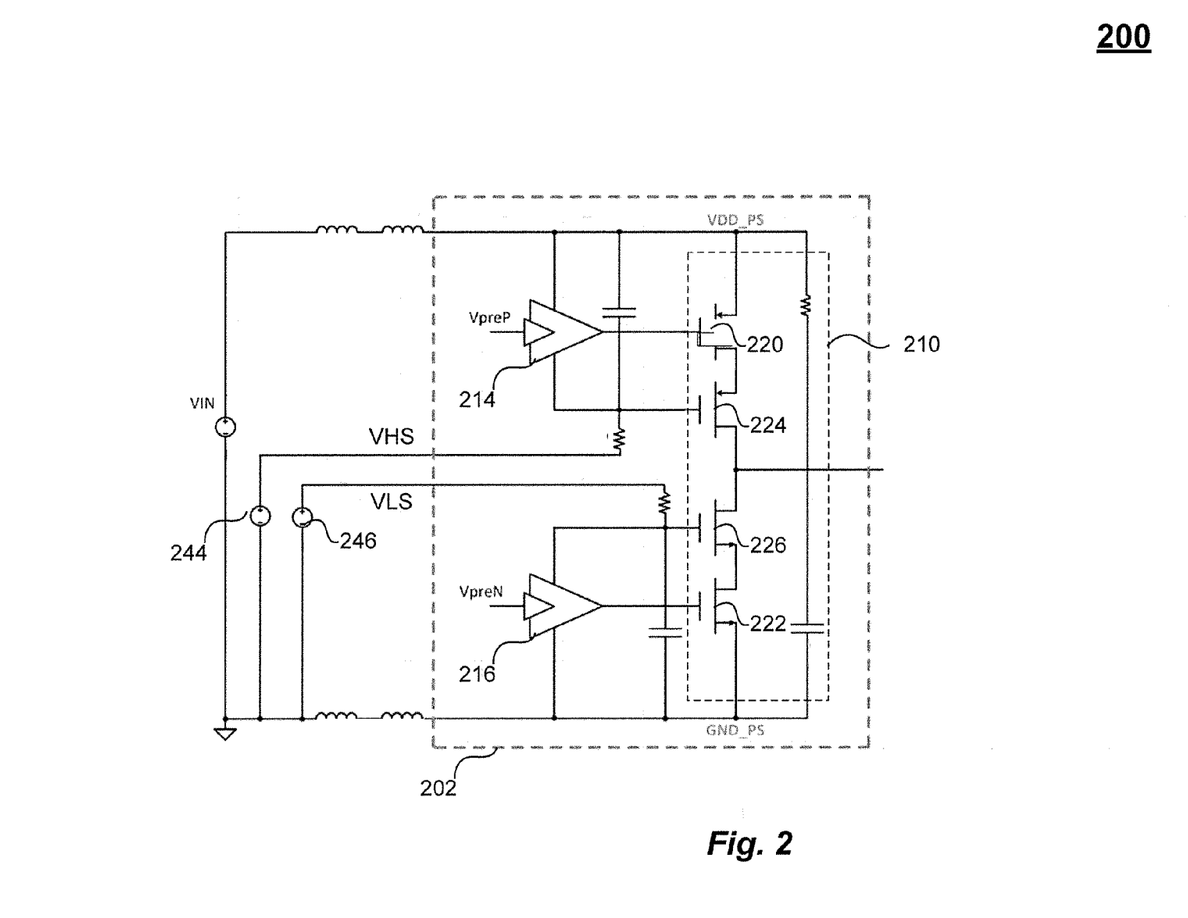
FIG. 2 is a block diagram illustrating a charge-recycling circuit according to another embodiment.
Figure 3:
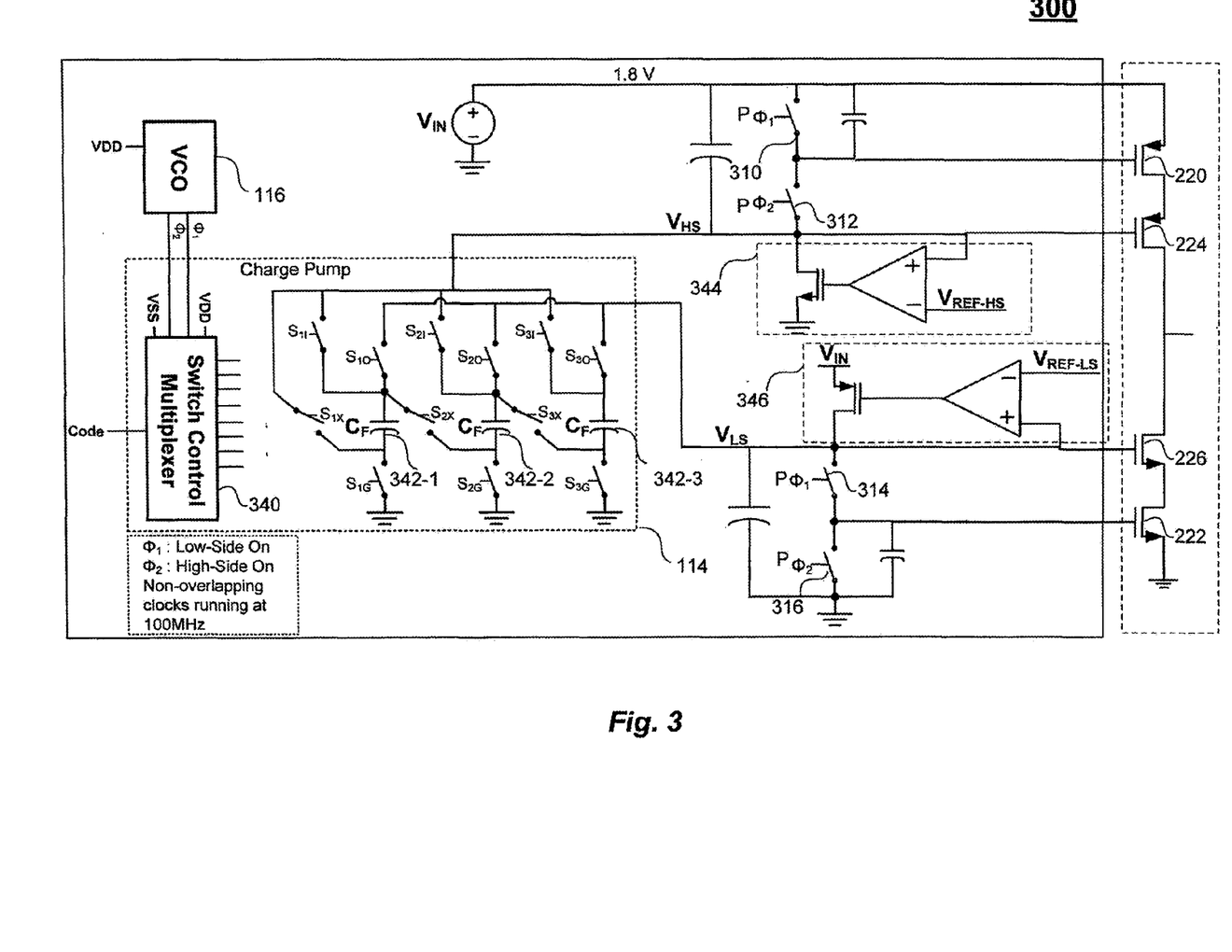
FIG. 3 is a block diagram illustrating a charge-recycling circuit according to yet another embodiment.

The output of LDO 104 is coupled to the output of LDO 102 through charge pump 114. Each LDO 102, 104 may produce a reference voltage for different circuit nodes in the system, such as shown in FIGS. 2 and 3. In this example, current from first load 107 associated with LDO 104 is channeled through charge pump 114 to second load 109 associated with LDO 102. Accordingly, when the second load 109 draws more current, charge pump 114 may provide the additional current rather than pass transistor 124 in LDO 102 providing the additional current. Because power generated by pass transistor 124 in LDO 102 is reduced, efficiency of charge-recycling circuit 100 is improved. In one embodiment, charge pump 114 provides a current to load 109 that equals or approximately equals the current through load 107. In this example, the current sunk in LDO 104 equals zero or is approximately zero.

FIG. 2 is a block diagram illustrating a charge-recycling circuit 200 according to an embodiment. Details of one embodiment of charge-recycling circuit 200 are shown in FIG. 3. Charge-recycling circuit 200 comprises a power stage 202, a high side mid-voltage source 244, and a low side mid-voltage source 246. Power stage 202 comprises a switching driver 210, a high side buffer circuit 214, and a low side buffer circuit 216.

Switching driver 210 comprises a high side switching power transistor 220, a low side switching power transistor 222, a high side cascode transistor 224, and a low side cascode transistor 226. Switching driver 210 can be a switching driver for a buck converter. Cascode transistors 224 and 226 are high side and low side cascode transistors, respectively, to reduce voltage drop across switching power transistors 220 and 222, respectively. High side mid-voltage source 244 and low side mid-voltage source 246 provide a high side mid-voltage (VHS) and a low side mid-voltage (VLS), respectively, as approximately constant gate drive voltages to cascode transistor 224 and cascode transistor 226, respectively. In this example, the low side mid-voltage (VLS) is greater than the high side mid-voltage (VHS). In one embodiment, high side mid-voltage source 244 can be LDO 102, and low side mid-voltage source 246 can be LDO 104. In this example, the load of high side mid-voltage source 244 is high side buffer circuit 214. Additionally, high side mid-voltage source 244 can be used as the low supply voltage for a high side driver that produces switching signals to high side switching power transistor 220. Accordingly, the high side driver is a load on high side mid-voltage source 244.

A similar arrangement is used for the low side. In this example, the load of low side mid-voltage source 246 is low side buffer circuit 216. Additionally, low side mid-voltage source 246 can be used as the low supply voltage for a low side driver that produces switching signals to low side switching power transistor 222. Accordingly, the low side driver is a load on low side mid-voltage source 246. Buffer circuits 214 and 216 receive pre-power stage voltages VpreP and VpreN, respectively, from pre-driver circuits (not shown) for driving the switching driver 210. Switches (not shown in FIG. 2 and described in conjunction with FIG. 3) provide the coupling for charge recycling between high side switching power transistor 220 and low side switching power transistor 222.

FIG. 3 is a detailed circuit illustrating a charge-recycling circuit 300 according to an embodiment. Charge-recycling circuit 300 can be used for switching regulator 210 of FIG. 2. Charge-recycling circuit 300 comprises charge pump 114, VCO 116, a plurality of switches 310, 312, 314, and 316, and a plurality of LDOs 344 and 346.

Response to a supply voltage VDD, VCO 116 generates a clock φ1 and a clock φ2 that, in this example, are non-overlapping clocks running at 100 MHz. The clock φ1 and clock φ2 are used for timing of charge pump 114 and control signals for switches 310, 312, 314, and 316.

LDO 344 generates the high side mid-voltage (VHS) in response to a high side reference voltage (VREF-HS). LDO 344 can be LDO 244. LDO 346 generates a low side mid-voltage (VLS) in response to a low side reference voltage (VREF-LS). LDO 346 can be LDO 246. The outputs (the voltages VHS and VLS) of LDO 344 and LDO 346 are coupled together through charge pump 114. In this example, charge pump 114 receives a high side mid-voltage (VHS) (between about 0.4-0.8 V) and outputs charge to the low side mid-voltage (VLS) to maintain the low side mid-voltage (VLS) at close to 1.2 V. In this example, the input voltage Vin equals the power supply Vdd may vary from 1.6-2 V, and charge pump 114 is configured to produce different gain based on the value of power supply Vdd to maintain low side mid-voltage (VLS) at close to 1.2 V.

Switches 310 and 312 coupled between the input voltage Vin and the high side mid-voltage (VHS) are switches in the high side driver. Switches 314 and 316 coupled between the low side mid-voltage VLS and ground are switches in the low side driver.

On the high side driver, switch 310 selectively couples the gate of high side switching power transistor 220 and switch 320 to the input voltage Vin in response to a first control signal (e.g., being in an active state or on state). Switch 312 selectively couples the gate of high side switching power transistor 220 to the output of LDO 344 in response to a second control signal (e.g., being in an active state or on state).

On the low side driver, switch 316 selectively couples the gate of low side switching power transistor 222 to ground in response to the second control signal (e.g., being in an active state or on state). Switch 314 selectively couples the gate of low side switching power transistor 222 to the output of LDO 346 in response to a first control signal (e.g., being in an active state or on state).

Switch 310 and switch 314 are controlled by a first control signal (clock Pφ1). Switch 312 and switch 316 are controlled by a second control signal (clock Pφ2). Switches 310 and 314 open before switches 312 and 316 close, and similarly switches 312 and 316 open before switch 310 and switch 314 close ("break before make"). During clock Pφ1, the low side is on. Clock Pφ1 closes switch 310 to pull the gate of high side switching power transistor 220 to the input voltage Vin to turn off high side switching power transistor 220 and pulls the gate of low side switching power transistor 222 to the low side mid-voltage (VLS) to turn on low side switching power transistor 222. During clock Pφ2, the high side is on. Clock Pφ2 closes switch 312 to pull the gate of high side switching power transistor 220 to the high side mid-voltage (VHS) to turn on high side switching power transistor 220 and closes switch 316 to pull the gate of low side switching power transistor 222 to ground to turn off low side switching power transistor 222.

Charge pump 114 comprises a switch control multiplexer 340, a plurality of capacitors 342, and a plurality of switches S1I, S2I, S3I, S1G, S2G, S3G, S1O, S2O, S3O, S1X, S2X, and S3X.

Switch control multiplexer 340 generates control signals to switch charge pump 116 for controlling the gain of charge pump 114 in response to the compared voltage Ve from comparator 142.

Switches S1I, S2I and S3I selectively couple capacitors 342-1 through 342-3, respectively, to the high side mid-voltage (VHS) provided by LDO 344 to transfer charge from the high side to the capacitors 342 in response to corresponding control signals from switch control multiplexer 340.

Switches S1G, S2G and S3G selectively couple capacitors 342-1 through 342-3, respectively, to ground in response to corresponding control signals from switch control multiplexer 340.

Switches S1O, S2O and S3O selectively couple capacitors 342-1 through 342-3, respectively, to the low side mid-voltage (VLS) provide by LDO 346 to transfer charge from the capacitors 342 to the low side in response to corresponding control signals from switch control multiplexer 340.

Switches S1X, S2X and S3X selectively couple selected capacitors 342-1 through 342-3 in series and to the high side mid-voltage (VHS) to boost the voltage and set the gain of the charge pump in response to corresponding control signals from switch control multiplexer 340. Three capacitors 342 are shown in FIG. 3, but other numbers can be used to provide other values of gain of charge pump 114.

The switches described herein can be implemented as one or more transistors.

Figure 4:
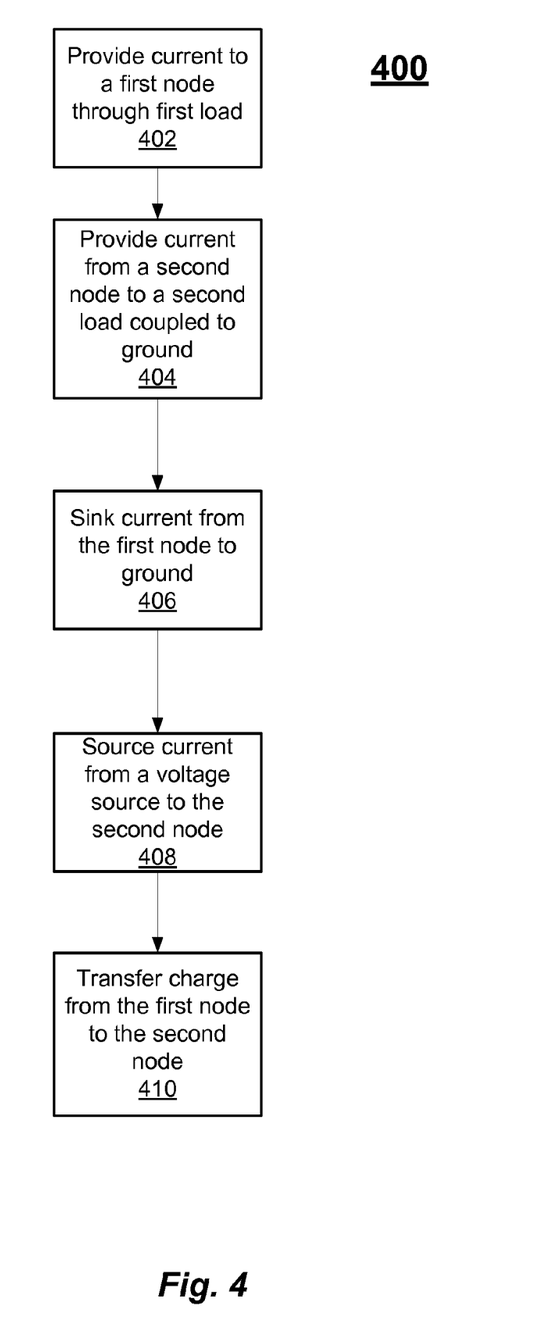
FIG. 4 illustrates a simplified diagram illustrating a process flow for recycling current according to an embodiment.

FIG. 4 illustrates a simplified diagram illustrating a process flow 400 for recycling current according to an embodiment. At 402, a first current from a first input voltage Vin is provided to first load 107. In this example, an output terminal of first load 107 is at voltage Vs1. At 404, a second current is provided to an input terminal of second load 109. In this example, the input terminal of second load 109 is at voltage Vs2. At 406, a third current is sunk from the output terminal of first load 107 through LDO 104 to ground. At 408, a fourth current is sourced from a second input voltage to the input terminal of second load 109 via, for example, LDO 102. In some embodiments, the voltage Vs2 is greater than the voltage Vs1. In one embodiment, the second input voltage equals the first input voltage. At 410, charge is transferred by charge pump 114 from first load 107 to the second load 109 to reduce the third current. In one embodiment, transferring charge reduces the third current to approximately zero. This effectively turns off pass transistor 134 of LDO 104 at such times.

The charge pump 114 has an adjustable gain that is adjusted based on the voltage Vs1 and the voltage Vs2. In one embodiment, the gain is determined based on the difference between the voltage Vs1 and the voltage Vs2. In one embodiment, the gain is determined based on the ratio of the voltage Vs2 and the voltage Vs1 (Vs2/Vs1). Because the gain of charge pump 114 of FIG. 3 has values of 1, 2, 3, and 4, the gain can be the first available value higher than the ratio.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A circuit comprising:
    a first load circuit coupled to a first input voltage;
    a current sinking circuit coupled to an output of the first load circuit;
    a second load circuit coupled to ground;
    a current sourcing circuit coupled between a second input voltage and an output of the second load circuit; and
    a charge-recycling circuit coupled between the output of the first load circuit and the output of the second load circuit to provide current from the current sinking circuit to the output of the current sourcing circuit to reduce current through the current sourcing circuit.

2. The circuit of claim 1 wherein the charge-recycling circuit is a charge pump.

3. The circuit of claim 1 wherein the charge-recycling circuit provides current from the current sinking circuit to the output of the current sourcing circuit that approximately equals current through the first load circuit.

4. The circuit of claim 1 further comprising a switching regulator comprising cascode devices having gates coupled to the respective outputs of the current sinking circuit and the current sourcing circuit.

5. The circuit of claim 1 further comprising a switching regulator comprising a first switching transistor, a first cascode transistor, a second cascode transistor, and a second switching transistor coupled in series between the first input voltage and ground, wherein the first switching transistor has a gate coupled to the first load circuit, the first cascode transistor has a gate coupled to the current sinking circuit, the second cascode transistor has a gate coupled to the current sourcing circuit, and the second switching transistor has a gate coupled to the second load circuit.

6. The circuit of claim 1 wherein the charge-recycling circuit has a variable gain based on the first input voltage.

7. The circuit of claim 1 wherein the current sourcing circuit is a low dropout regulator and the current sinking circuit is a low dropout regulator.

8. The circuit of claim 1 further comprising a voltage controlled oscillator coupled to the charge-recycling circuit to provide a clock signal to control the timing of the charge recycling circuit.

9. The circuit of claim 8 wherein the clock signal is based on the first input voltage.

10. A circuit comprising:
    a current sourcing circuit having an output;
    a current sinking circuit having an output;
    a first switch configured to couple a first voltage signal to a first power switching device in response to a first control signal being active;
    a second switch configured to couple the first power switching device to the output of the current sinking circuit in response to a second control signal, wherein the first control signal and the second control signal are non-overlapping signals;
    a third switch configured to couple the output of the current sourcing circuit to a second power switching device in response to the first control signal;
    a fourth switch configured to couple the second power switching device to ground in response to the second control signal; and
    a charge-recycling circuit coupled to the output of the current sourcing circuit and to the output of the current sinking circuit, the charge-recycling circuit receiving charge from the current sinking circuit output in response to the second control signal being active and the first control signal being inactive, and providing charge to the current sourcing circuit output in response to the first control signal being active.

11. The circuit of claim 10 wherein the current sourcing circuit is a low dropout regulator and the current sinking circuit is a low dropout regulator.

12. The circuit of claim 10 wherein the charge-recycling circuit has an adjustable gain that is adjusted based on the first voltage signal.

13. The circuit of claim 10,
    wherein a first terminal and a second terminal of the first power switching device are coupled to the first voltage signal and a first terminal of a first power cascode device, respectively, and a gate of the first power switching device is coupled to the first switch and the second switch,
    wherein a second terminal of the first power cascode device is coupled to an output terminal, and a gate of the first power cascode device is coupled to the output of the current sinking circuit,
    wherein a first terminal of the second power switching device is coupled to ground, and a gate of the second power switching device is coupled to the third switch and the fourth switch, and
    wherein a first terminal and a second terminal of the second power cascode device are coupled to the output terminal and a second terminal of the second power switching device, respectively, and a gate of the second power cascode device is coupled to the output of the current sourcing circuit.

14. The circuit of claim 10 wherein the current sinking circuit is coupled to a second voltage signal.

15. The circuit of claim 14 wherein the charge-recycling circuit has an adjustable gain that is adjusted based on the first voltage signal and the second voltage signal.

16. A method comprising:
  providing a first current from a first input voltage to a first load circuit coupled to a first node, the first node being at a first node voltage;
  providing a second current from a second node to a second load circuit coupled to ground;
  sinking a third current from the first node through a current sinking circuit to ground;
  sourcing a fourth current from a second input voltage to the second node, the second node being at a second node voltage, the second node voltage being greater than the first node voltage; and
  transferring charge from the first node to the second node to reduce the third current.

17. The method of claim 16 wherein a charge pump transfers the charge from the first node to the second node.

18. The method of claim 16 wherein transferring charge from the first node to the second node to reduce the third current to approximately zero.

19. The method of claim 16 further comprising:
  coupling the first node and the second node to respective gates of cascode devices of a switching regulator.

20. The method of claim 16 wherein the transferred charge is adjusted based on the difference between the first node voltage and the second node voltage.

* * * * *